United States Patent Office 2,835,591
Patented May 20, 1958

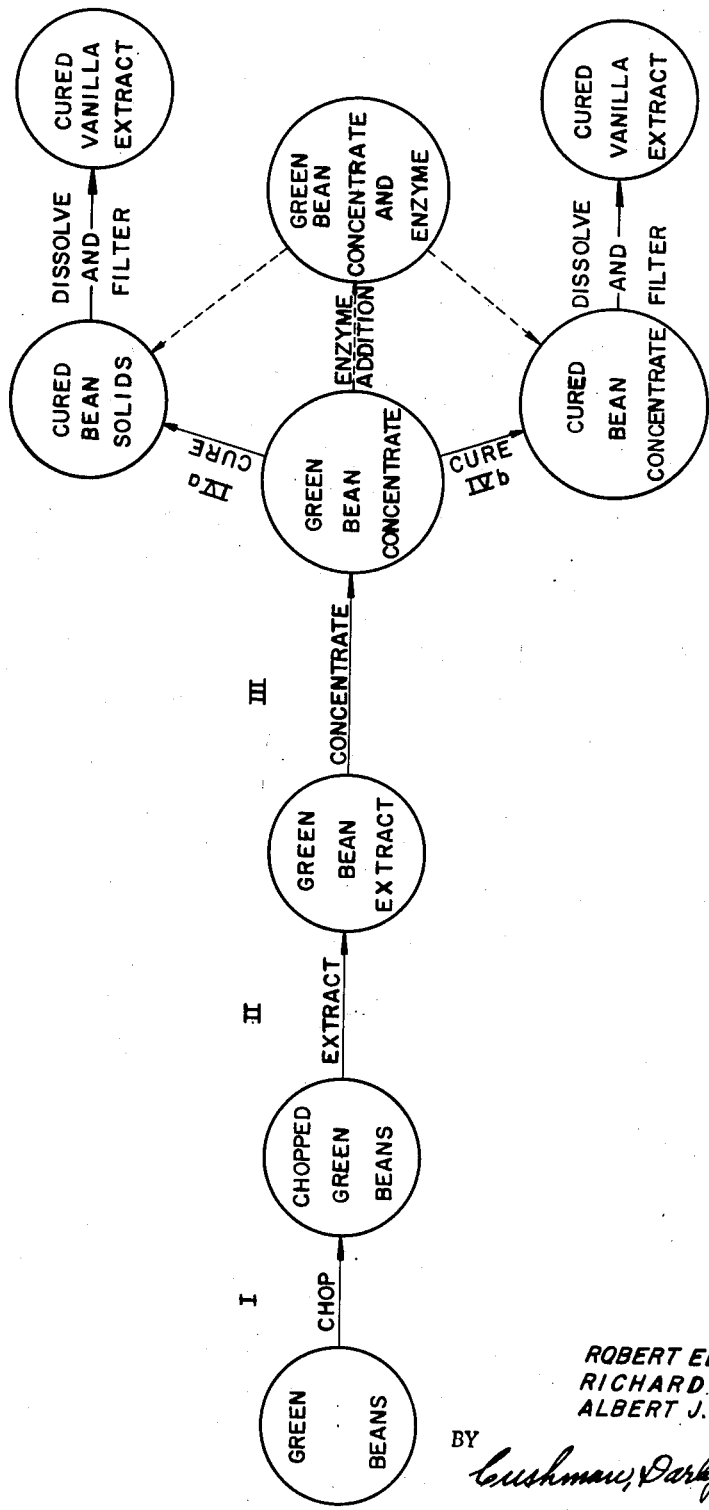

2,835,591

METHOD OF PRODUCING CURED VANILLA EXTRACT FROM GREEN VANILLA BEANS

Robert Edwin Graves and Richard Leland Hall, Baltimore, and Albert Joseph Karas, Catonsville, Md., assignors to McCormick & Company, Inc., Baltimore, Md., a corporation of Maryland Application August 23, 1955, Serial No. 530,052

24 Claims. (Cl. 99—140)

The present invention relates to a new method for producing cured vanilla extract from green vanilla beans. More particularly, our invention relates to the curing of green vanilla bean extract after extraction thereof from the mature green vanilla bean and concentration thereof.

It should immediately be noted that the invention represents a novel and radical departure from former processes, because extraction and concentration of green bean extract are initially carried out followed by curing of the green bean extract in that form. Such process prevents the destruction and dissipation of the natural volatile oils and other constituents which contribute the aroma and flavor characteristics of vanilla. Thus, a final vanilla extract is obtained of far richer flavor and aroma than realized by prior processes wherein curing preceded extraction and concentration.

Various methods have been utilized in the past for the preparation of cured vanilla extract from vanilla beans. In this respect, it should immediately be noted that the unripe or green vanilla bean has no vanilla flavor or odor and these are developed during a curing process.

Curing has previously been performed by various processes. Naturally, vanilla beans will cure if left on the vine and this is, of course, the earliest known means of accomplishing such curing. Later on, this primitive method of curing was improved upon through the use of processes such as the Mexican and Bourbon processes. In the Mexican process, the green beans are placed on blankets and are exposed to the direct rays of the sun for about an hour. They are then placed in blanket lined cases where they are allowed to "sweat" for twenty-four to forty-eight hours. The sweating process is repeated a number of times after which the beans are allowed to cool and age until cured.

The Bourbon process is essentially the same as the Mexican process except for the fact that the beans are not exposed to direct rays of the sun and are initially plunged into water near the boiling point. Both the Mexican and Bourbon processes take three to four months to complete, and both are followed by extraction of the cured vanilla, and, if desired, by concentration thereof.

The curing processes described heretofore have been improved upon in the past. For example, a process involving pulping the green beans and then heating the pulp in intimate association with air to effect a cure has been perfected. Here again, however, extraction, and, when desired, concentration of the vanilla, follows curing.

As noted heretofore, it has become apparent that an undesirable loss in flavor and odor occurs during conventional curing processes, and particularly during concentration of extracts of conventionally cured beans. Therefore, the present invention contemplates a method by which curing is carried out after extraction and concentration of the vanilla extract since flavor and odor are not developed until the curing step, and undesirable loss of such properties is eliminated.

With the above in mind, the primary object of this invention is to produce cured vanilla extract from green vanilla beans by a process which results in retention of vanilla flavor and odor to a far greater degree than was achieved by processes heretofore employed.

Another object of this invention is to provide a process for producing cured vanilla extract from green vanilla beans whereby substantially all of the constituents which impart characteristic flavor to vanilla and contribute to the characteristic aroma of vanilla, are retained in the final extract.

A further object of this invention is to provide a process for producing cured vanilla extract from green vanilla beans which comprises extracting green bean extract from green vanilla beans in the absence of oxygen, concentrating such extract under a vacuum, then curing the concentrated extract and adding ethyl alcohol to thereby produce a cured vanilla extract.

Still another object of this invention is to provide a novel process for curing a concentrated vanilla bean extract to thereby form cured vanilla extract without destroying the constituents which impart characteristic flavor to the vanilla and contribute to the characteristic aroma of vanilla.

Another and more specific object of this invention is to provide a novel process for producing cured vanilla extract from green vanilla beans as noted heretofore, wherein one or more enzymes may be added to the vanilla beans or bean extract at any point prior to, or during, the curing process.

Other and further objects of the invention will be in part apparent and in part set out in the detailed description of the several steps in the process which follows.

Referring to the accompanying drawing, we illustrate a flow diagram of the various steps comprising the process.

In step I, a given weight of mature green vanilla beans of a known moisture content are finely chopped in an oxygen-free atmosphere. A typical moisture content of the bean is about 85%. Any conventional chopping means can be utilized.

Step II contemplates extracting the green bean extract from the chopped green beans and involves first adding water to the chopped beans. The temperature of the water is normally about room temperature (25° C.) but can be varied so long as the flavor producing ingredients of the beans are not adversely affected. Addition of water is preferably in the approximate ratio of about three parts water to two parts beans, by weight. This ratio can, of course, be varied over wide limits and is defined only by practical expediency. Sufficient water should be added to provide a workable mass.

The water and bean mixture is thoroughly agitated by any suitable means. The mixture is then pressed through a filter medium on which the bulk of the bean fibrous material is retained and the filtrate is reserved representing the first green bean extract.

After this initial extraction, additional extraction steps are carried out, the exact number of which is determined only by the desire to insure substantially complete extraction. Each of such additional steps involves washing the fibrous material retained in the filter medium by thoroughly mixing the same with water as in the initial extraction. Again, the amount of water added is variable and depends upon practical considerations. The mixture is then filtered through the same filter medium as was used for the first extract. The residue retained from these additional extraction steps is then discarded and the various filtrates are combined with the initial filtrate and are either reserved for the following concentration step, or for immediate curing.

In connection with the last statement heretofore, concentration is to be normally considered a part of our process. Alternatively, immediate curing following extraction is possible subject to the fact that, in the case of our alternative liquid curing step described hereinafter, a dilute final extract is obtained. To amplify on this, vanilla extract made by our process is typically marketed as an extract of "multi" or "single" strength makeup. Such strengths require at least some concentration of green bean extract so that the concentration step is necessary. However, omission of concentration from our process will result in a final extract which, although diluted below single strength, and not typically marketable, is, nevertheless, a product of some utility and contemplated by our invention.

In the case of utilization of our other curing step described hereinafter, which involves evaporation of green bean extract to dryness, we are not here faced with the attainment of a dilute final extract upon the omission of the concentration step because, of course, the very act of evaporating constitutes a type of concentration. Nevertheless, a separate preceding concentration step is still desirable because of the fact that evaporation of a non-concentrated large volume of extract would be commercially impractical.

It should be noted that the extraction steps noted heretofore are also carried out in an oxygen-free atmosphere. In addition, it can be stated that any suitable type of filter medium can be used.

As previously stated, the green vanilla beans and the green vanilla bean extract taken therefrom, have no vanilla flavor or odor. The oxygen-free atmosphere helps to insure such conditions, since development of flavor and odor are desired to be postponed until the final curing step.

The make-up of the green bean extract comprises water, and soluble and insoluble green vanilla bean solids. Of course, the exact composition is determined by the amount of green beans initially utilized, the amount of water used for extraction, and the degree of extraction that is carried out. As pointed out heretofore, all of these factors are variable dependent only upon practical and commercial expediency.

Subject to the above comments as to possible omission of concentration step, the combined filtrates are then conveyed to a vacuum concentrator wherein concentration, which is step III of the process, occurs. The green bean extract is placed in this concentrator and heated under a vacuum to a temperature not substantially greater than about 30° C. and preferably about 28° C. The upper limit of 30° C. is subject to some variation and it should be borne in mind that, in the final analysis, the temperature of concentration should not be so high as to adversely affect the flavor producing ingredients of the green bean extract. As great a degree of vacuum as commercially practicable is desired.

The concentrator can be of standard design well known in the art. It contemplates the use of heat and high vacuum. A vacuum of about 35 mm. of mercury absolute is preferred.

The green bean extract is concentrated to whatever volume is necessary in order that the final concentrated extract will be of required strength and in accordance with practical expediency. As noted heretofore in the case of liquid curing, the degree of concentration of extract determines, to some extent, the strength of the final cured vanilla extract and, accordingly, is variable depending on whether a dilute extract or one of at least single final strength is desired. In any event, concentration should be carried out to an extent sufficient to permit the addition of at least some ethyl alcohol, preferably 35% of final volume of cured vanilla extract.

In the case of curing involving evaporation of green bean extract, the degree of concentration is governed by commercial expediency, i. e., the less the degree of concentration, the more evaporation that is required in the curing step.

Of course, in both instances noted heretofore, concentration should not be carried to such a great degree or accomplished in such a manner as to commence curing of the green bean extract in the concentration stage.

The next step in the process, step IV, involves curing the concentrated green bean extract. However, before curing, or, as a matter of fact, during curing, one or more enzyme systems, as, for example, pectinolytic, diastatic, proteolytic, glycosidases and catalase, in different combinations and amounts, can be added to the green bean concentrate. These enzyme systems have been found to be of value in varying the taste, odor, physical and chemical characteristics of the final cured vanilla extract.

It has not been definitely ascertained as to the particular chemical phenomena that occur by the addition of these enzymes. However, we have found, for example, that a proteolytic enzyme such as Rhozyme A–4, contributes significantly to the desirable characteristics noted heretofore in the final cured vanilla extract. Other specific enzymes that are contemplated, exemplified hereinafter.

Pectinolytic: Pectinol O
Proteolytic: Rhozyme A–4
Cellulase, cellobiase, hemicellulase, gumase, pentosanase, maltase: Enzyme 19
Lipase, esterase: Lipase B
Diastatic: Rhozyme R–48, Rhozyme S
Glucose-oxidase, catalase: DeeO
Amylase, dextrinase, maltase, protease, peptidase, renin, phosphotase, cellulase, sulfatase, invertase: Clarase 300
Catalase: Catalase
B glycosidase: Emulsin Step IV of the illustrated flow chart, constitutes the final curing step and achievement of cured vanilla extract. Alternative steps have been found to work equally well and are designated IVa and IVb.

In step IVa the green bean concentrate is spread as a liquid film on metal or glass trays. The trays are placed in a vacuum oven where they are subjected to heat. The preferred temperature range is 60° C.–90° C. with about 75° C. being the optimum. The maximum temperature range that can be considered operable ranges from 40° C. to 110° C.

The vacuum oven in which the concentrated green bean extract is placed is preferably under a vacuum of 35 to 100 mm. of mercury absolute, with 45 mm. being typical. The maximum working range can be considered to be from 35 to 350 mm. absolute.

Curing in the vacuum oven under the above conditions is preferably carried out for a period of five–ten hours with six hours being optimum. Again, the maximum time period range contemplated is one hour–twenty-four hours.

During this curing step, the constituents which impart characteristic flavor and aroma to vanilla are developed. It should be pointed out that the flavor and aroma characteristics of vanilla, developed by both curing steps IVa and IVb, the latter to be described, correspond to those developed in the presently used methods noted heretofore, even though curing is not carried out until after extraction and concentration. As a matter of fact, these beneficial characteristics are present to a far greater degree because of the fact that no loss of flavor, aroma, and the like occurs during the extraction and concentration of the undeveloped green bean extract.

Following curing, the dry residue is scraped from the trays and combined with ethyl alcohol and water to produce a final cured extract of desired strength. After the residue is thoroughly mixed with the alcohol, it is allowed to stand until all soluble material is dissolved. At the end of this time, the liquid is filtered to remove all insoluble particles and the resulting liquid is an acceptably cured extract.

In step IVb, the green bean concentrate of step III is cured by heating in a vessel at a preferred temperature of 55°–80° C. with 60° C. being typical. Although a preferred temperature range has been set forth, maximum range of 20° C.–100° C. is contemplated.

The concentrate is heated for a preferred time period of 48–150 hours, with 50 hours being typical. Again, the preferred range is set forth, but a maximum range of 12 hours–300 hours is contemplated.

Heating can be achieved in many ways. For example, the green bean extract may be placed in a tank with a coiled pipe mounted therein. Hot water, which may be thermostatically controlled to maintain the desired temperature within the tank, is circulated through the coiled pipe.

Throughout the heating period, an inert gas such as nitrogen, mixed with oxygen, is bubbled through the concentrate. The preferred amount of oxygen is 1%–20% of the total volume of gas with 5% being typical. However, 0.1%–30% oxygen is contemplated as the broadest range.

The gaseous mixture can be applied to the concentrate in many ways, e. g., by delivery through a plurality of holes in the bottom of the tank aforesaid. The gas is pumped into the tank and thus intimately mixed with the concentrate as it is being heated.

At the end of the curing period, the cured concentrate is mixed with ethyl alcohol. Water can also be added with the alcohol and the solution is allowed to stand until all soluble material is dissolved. The solution is then filtered to remove insoluble particles and the resulting extract is in final acceptable form.

Of course, the final volume of extract is primarily dependent upon the amount of starting material, the degree of extraction, and final fold strength desired. These features determine the amount of alcohol and water added in curing steps IVa and IVb with the alcohol representing about 35% of volume in the final cured extract. This latter figure can vary, but has been found to be commercially desirable.

EXAMPLES

Initial extraction (oxygen-free atmosphere)

1200 grams of fresh, whole, mature finely chopped green vanilla beans (80–90% moisture) were agitated in a large Waring Blendor (4 quart capacity) with 800 cc. of water, at room temperature (25° C.), for about three minutes. The resulting mixture was filtered through four layers of cheese cloth, with the liquid passing through the cloth being reserved to be combined with water washes, and the residue on the cloth, after being pressed to remove liquid entrapped therein, was reserved for the first wash.

First wash

Residue from the initial extraction was agitated in the Waring blendor with 600 cc. of water at room temperature (25° C.) for about three minutes. The resulting material in the blendor was filtered through four layers of cheese cloth, with the filtrate being reserved to be combined with the initial extract and later washes, and the pressed filter cake being reserved to be used in the succeeding wash.

Second and third washes

These washes are identical with wash #1 in volume, temperature of water, and time of agitation.

After the extraction and subsequent washes were completed, all of the filtrates were combined to give a final volume of 3650 cc. This liquid was reserved to be used in the concentration.

Concentration

The 3650 cc. of liquid was concentrated in a laboratory concentrator under a reduced pressure of 35 mm. of mercury, at a temperature of 29° C., to a volume of 1000 cc. The concentrate was divided into five portions of 200 cc. each. Two of the 200 cc. portions of concentrate were reserved for curing by the following methods.

First portion (cured to dryness in vacuum oven)

Concentrate in the amount of 200 cc. was spread out in a thin film, 1/16″ thick, upon aluminum dishes, and placed in a vacuum oven under a reduced pressure of 50 mm. of mercury, at a temperature of 70° C. for a period of six hours. At the end of this time, the dried vanilla solids were scraped from the aluminum dishes and combined with ethyl alcohol and water to 400 cc. total, with the final concentration of alcohol being 40% by volume. This solution was then filtered through a Büchner funnel to remove insoluble suspended particles. The loss in volume due to removal of such particles was insignificant.

Enough alcohol and water were added to yield a final extract of "single" strength. Since we know the total volume of finished single strength extract that the beginning weight of beans would produce based on accepted definition and on the extraction steps carried out, it was then possible to determine the amount of alcohol and water to be added to achieve such volume.

Second portion (cured as a liquid)

Concentrate in the amount of 200 cc. was held in a glass vessel at a temperature of 55° C. for 48 hours. During that time a mixture of nitrogen and oxygen (5% oxygen) were bubbled through the material. At the end of the curing, the 200 cc. of cured concentrate was combined with alcohol and water to a final volume of 400 cc. (40% ethyl alcohol). The cured extract was then filtered to remove insoluble particles, with the resulting extract considered to be single strength.

The final volume of 400 cc. in both instances was determined by considering the following:

It should be noted that the original 1200 grams of green vanilla beans is approximately equivalent to 200 grams of cured dried vanilla beans, and 200 grams of cured dried vanilla beans can make 2000 cc. of single strength vanilla extract after substantially complete extraction is carried out. When a 200 cc. portion of the 1000 cc. of concentrate was removed for curing, this portion contained one-fifth of the extractable matter of 1200 grams of green vanilla beans or 200 grams of cured dried beans. This is equivalent to 240 grams of green beans or 40 grams of cured dried beans. 40 grams of beans cured and dried is equivalent to 400 cc. of single strength extract (based on U. S. Department of Agriculture definition hereinafter set forth).

The two examples cited both end up with a single strength extract. This was done in these experiments for convenience in order to more easily evaluate the quality (taste and odor and chemical properties) and compare them with existing single strength extracts which can be considered to be standards.

The present process of preparing vanilla extract is a radical departure from former processes, because extraction and concentration of green bean extract are initially carried out followed by curing of the concentrated green bean extract in that form. Processing of the green bean extract, as described, prevents the destruction and dissipation of the natural volatile oils and other constituents which contribute the aroma and flavor characteristics of vanilla. The process, therefore, results in a final vanilla extract of richer flavor and aroma than previously obtained.

It should additionally be noted that our process is much more economical than previous methods, since the unusable portions of the bean are eliminated early in the processing. This lowers the cost of such factors as handling, time expended, and the like.

The definition of "single" strength for the purposes of this specification is the extractable matter from 10 grams of cured and dried vanilla beans per 100 cc. of cured vanilla extract.

As noted heretofore, although preferred ranges of temperature, time, vacuum conditions, concentration and the like have been set forth, broader ranges are many times contemplated. It must be understood that the invention is not limited to preferred ranges so long as the desired results are effected. The invention includes all variations in procedures covered by the appended claims and their equivalents.

We claim:

1. The method of producing cured vanilla extract from green vanilla beans which comprises extracting green bean extract from green vanilla beans substantially in the absence of oxygen, then curing the green bean extract to thereby produce a cured vanilla extract of greatly enhanced flavor and aroma.

2. The method of claim 1 wherein ethyl alcohol and water are added to the extract following curing and in amount sufficient to produce a cured vanilla extract of desired strength.

3. The method of claim 2 wherein the said curing and alcohol-water addition stages comprise evaporating the green bean extract to dryness in a vacuum to form a cured residue and combining the residue with alcohol and water.

4. The method of claim 3 wherein evaporation is carried out at a temperature of from about 40° C. to 110° C. and for a time period of from about one hour to twenty-four hours.

5. The method of claim 1 wherein said curing step comprises heating said green bean extract while coincidentally bubbling an inert gas and oxygen therethrough.

6. The method of claim 5 wherein heating and gas treatment are carried out at a temperature of from about 20° C. to 100° C. and for a time period of from about twelve hours to three hundred hours.

7. The method of claim 5 wherein the inert gas is nitrogen and wherein the oxygen is in amount of from about 0.1% to 30% of the total volume of nitrogen and oxygen.

8. The method of claim 1 wherein at least one enzyme system is added to the green bean extract following extraction.

9. The method of claim 1 wherein substantially all the green bean extract is extracted in the extraction stage.

10. The method of claim 1 wherein a cured vanilla extract of single strength is produced.

11. The method of producing cured vanilla extract from green vanilla beans which comprises extracting green bean extract from green vanilla beans substantially in the absence of oxygen, concentrating said extract under a vacuum, then curing the concentrated extract and adding ethyl alcohol to thereby produce a cured vanilla extract of greatly enhanced flavor and aroma.

12. The method of claim 11 wherein the said curing and alcohol addition stages comprise evaporating the concentrated extract to dryness in a vacuum to form a cured residue and combining the cured residue with alcohol and water, said alcohol and water being added in amount sufficient to produce a cured vanilla extract of desired strength.

13. The method of claim 12 wherein evaporation is carried out at a temperature of from about 60° C. to about 90° C. and for a time period of from about five hours to about ten hours.

14. The method of claim 12 wherein the residue-alcohol-water material is allowed to stand for a time sufficient to dissolve substantially all soluble material, and thereafter the said mixture is filtered to remove all insoluble particles.

15. The method of claim 11 wherein the said curing and alcohol addition stages comprise heating the said concentrated green bean extract while coincidentally bubbling an inert gas and oxygen therethrough, and thereafter adding water and alcohol to said extract.

16. The method of claim 15 wherein heating and gas treatment are carried out at a temperature of from about 55° C. to 80° C. and for a time period of from about forty-eight hours to one hundred fifty hours.

17. The method of claim 15 wherein the inert gas is nitrogen and wherein the oxygen is in amount of from about 1% to 20% of the total volume of nitrogen and oxygen.

18. The method of claim 15 wherein said water-alcohol-extract mixture is allowed to stand for a time sufficient to dissolve substantially all soluble material and thereafter filtered to remove all insoluble particles.

19. The method of claim 11 wherein said chopping and extraction stages comprise chopping up mature green vanilla beans, adding cold water to the chopped beans to thereby form a first bean-water mixture, thoroughly agitating and mixing the said first bean-water mixture, passing the said first bean-water mixture through a filtering medium to thereby provide a first filtrate and filtered solid material, washing the filtered solid matter by adding additional cold water thereto and agitating the same to thereby form a second water-bean mixture, passing the second water-bean mixture through the same filtering medium as was used on the first water-bean mixture to thereby provide a second filtrate, repeating the last two recited washing and filtering steps and thereafter combining the resulting filtrates to form the extract.

20. The method of claim 19 wherein water in the water addition steps is added in amount of about 3 parts water to 2 parts beans by weight.

21. The method of claim 11 wherein said concentration stage comprises heating said extract under a vacuum at a temperature of not more than 30° C.

22. The method of claim 11 wherein at least one enzyme system is added to the green bean extract following concentration thereof.

23. The method of claim 11 wherein substantially all the green bean extract is extracted in the extraction stage.

24. The method of claim 11 wherein a cured vanilla extract of single strength is produced.

References Cited in the file of this patent

UNITED STATES PATENTS

| | | |
|---|---|---|
| 1,515,714 | Wussow | Nov. 18, 1924 |
| 2,601,635 | Romagnan | June 24, 1952 |
| 2,621,127 | Towt | Dec. 9, 1952 |